June 12, 1928.

W. B. McBRIDE 1,673,293

DUST CAP FOR TIRE INFLATING TUBES

Filed Jan. 18, 1927

Inventor

W. B. McBride.

By Lacey & Lacey, Attorneys

Patented June 12, 1928.

1,673,293

UNITED STATES PATENT OFFICE.

WILLIAM B. McBRIDE, OF AKRON, OHIO.

DUST CAP FOR TIRE-INFLATING TUBES.

Application filed January 18, 1927. Serial No. 161,867.

This invention relates to tire valves and more particularly to a dust cap adapted to be applied to the inflating tube of a tire. At the present time the inflating tubes of tires are provided with caps to prevent dust and water from entering the inflating tubes but the caps entirely enclose the tubes when in place and it is necessary to remove a cap in order to test the air pressure of a tire or inflate the tire. Therefore, one object of the invention is to provide a cap which may be removably applied to the inflating tube of a tire and permit the tire to be inflated or the pressure of the air in the tire tested without the cap being first removed.

Another object of the invention is to provide the cap with a plunger acting as a valve to close an opening in the outer end of the cap and also serving to move the valve in the inflating tube to an open position when it is desired to inflate a tire or test its air pressure.

Another object of the invention is to mount the plunger of the cap through the medium of a supporting disk so constructed that it may be firmly seated in the cap but easily removed therefrom when necessary and to further so form the supporting disk that it will not interfere with the passage of air through the cap.

The invention is illustrated in the accompanying drawing, wherein

Figure 1:
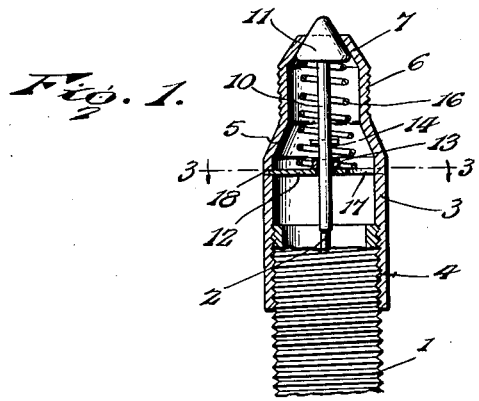
Figure 1 is a view showing the improved cap in longitudinal section and applied to a portion of a tire inflating tube shown in elevation with its upper portion broken away.

The improved cap constituting the subject-matter of this invention has been shown applied to a tire inflating tube 1 which is of a conventional construction and provided with the usual valve, the stem of which is shown in Fig. 1 and indicated by the numeral 2. The cap consists of a tubular body 3 formed of metal and having its lower or inner end portion internally threaded, as shown at 4, so that the cap may be screwed onto the threaded inflating tube 1. The upper or outer portion of the cap is formed with a tapered portion 5 to provide a reduced portion 6 which may be externally threaded so that an auxiliary cap may be applied to the cap 3 if so desired and the extreme outer end portion 7 of the cap is also tapered to form an internal seat 8 about the opening 9 at the outer end of the cap.

In order to control the passage of air through the cap and allow the valve of the inflating tube to be opened when necessary, there has been provided a plunger or stem 10 which extends axially of the cap and at its outer end is formed with an outwardly tapered head 11 conforming to the taper of the seat 8 so that it may have tight sealing engagement therewith. The plunger or stem 10 passes through an opening formed centrally in a supporting disk 12 and above the disk carries a collar 13 and an abutment pin 14. It should be noted that the abutment pin passes transversely through the plunger and projects from opposite sides thereof and that the collar is loose upon the plunger and formed with a tapered lower or inner portion adapted to fit into the downwardly converging seat 15 formed about the opening in the disk 12 through which the plunger passes. A spring 16 fits loosely about the plunger and has one end bearing against the head 11 and its inner end engaging the outer face of the disk so that the head will be normally held in seating engagement with the seat 8 to close the opening 9 but permitted to be moved inwardly in order to allow air to pass through the cap.

Figure 3:
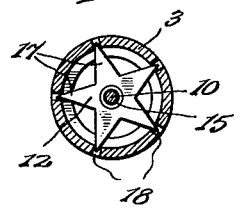
Fig. 3 is a transverse sectional view through the cap taken on the line 3—3 of Fig. 1.
Figure 4:
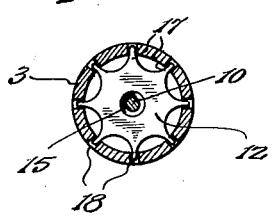
Fig. 4 is a view similar to Fig. 3 showing a modified form of supporting disk in the cap.

The supporting plate which is formed of resilient metal may be formed, as shown in Fig. 3 or as shown in Fig. 4. Referring to these figures, it will be seen that in each form the plate is provided with radially extending arms 17 which taper outwardly and are adapted to fit into openings or pockets 18 formed in the walls of the casing. The disk is of such diameter that pressure may be applied in order to force it through the tubular body of the cap. When the disk has been forced through the body to the position it is to occupy therein, the resiliency of the plate causes it to return to its normal flat position and the arms pass into the openings or seats 18 and serve to securely hold the plate in place and the spring will be compressed and serve to yieldably retain the head 11 in sealing engagement with the seat 8.

Figure 2:
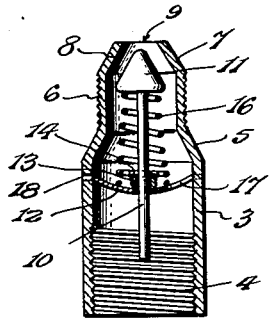
Fig. 2 is a longitudinal sectional view through the cap with its plunger moved inwardly.

The cap when in use is screwed upon the inflating tube of the tire and the inner end of the plunger 10 terminates close to the outer end of the valve stem 2. By an inspection of Fig. 1, it will be readily seen that, if it is desired to inflate the tire or test the air pressure of the tire, the coupling of an air pump may be engaged with the threaded portion 6 of the cap or a pressure gage of a conventional construction applied to this portion of the cap. When so applied, the coupling or tire gage will contact with the outer end portion of the head 11 which protrudes through the opening 9 and the plunger will be forced inwardly and by engagement with the valve stem 2 move the valve of the inflating tube to an open position. Air can then be forced into the tire or a sufficient quantity of air pass outwardly through the inflating tube and cap to operate the pressure gage. As soon as the pressure gage or pump coupling is removed, the spring 16 will return the plunger to the normal position shown in Fig. 1 and the valve of the inflating tube will again close. It will thus be seen that a tire may be tested or inflated without removing the cap. It should also be noted that this cap will constitute an auxiliary valve for the tire and prevent loss of air if the valve in the inflating tube is somewhat leaky. When the valve mechanism in the cap needs to be repaired or cleaned, the cap is removed from the inflating tube and the stem or plunger may be grasped by a pair of pinchers and drawn outwardly through the open inner end of the cap. When the plunger is drawn outwardly, it is first moved to the position shown in Fig. 2 in which position the ends of the pin 14 engage the collar 13 and force the collar into engagement with the seat 15 so that pressure is exerted upon the disk to cup the disk and move its arms out of the openings or seats 18. Continuation of the pulling action upon the stem will cause the disk to be drawn outwardly so that the entire valve mechanism is removed from the cap. The necessary repairs or cleaning can then be performed and the valve replaced in the cap.

Having thus described the invention, I claim:

1. A valve cap comprising a tubular body having its lower end portion adapted to be removably engaged with a valve casing and its upper end portion tapered to form an internal seat, the walls of said body being formed with seats intermediate its depth, a resilient disk of a diameter slightly greater than the internal diameter of said body and having marginal prongs received in said seats to removably anchor the disk in the body with portions of the disk spaced from the walls of the body to provide air passages, a stem disposed axially in the body and slidably passed through the disk, a head for said stem, a spring about the stem engaged with the head and disk to yieldably hold the head in engagement with the tapered seat of said body, and means carried by the stem for unseating said disk.

2. A valve cap comprising a tubular body having its lower portion adapted to be releasably engaged with a valve casing and its upper portion tapered to form an internal seat, the walls of said body being formed with seats intermediate its depth, a resilient disk of a diameter to be sprung into said body and formed with marginal prongs extending into the seats formed in the walls of said body to retain the disk in a set position, a stem disposed axially in said body and slidably passing through said disk, a head for said stem, a spring about the stem engaging the disk and head to yieldably hold the head in sealing engagement with the internal seat of said body, a collar fitted loosely upon said stem and resting upon the upper face of said disk, and an abutment carried by the stem above said collar and projecting transversely from the stem and adapted to engage the collar to move the disk out of the body when the stem is drawn outwardly through the open lower end of the body.

3. A valve cap comprising a tubular body having its lower portion adapted to be releasably engaged with a valve casing and its upper portion tapered to form an internal seat, the walls of said body being formed with seats intermediate its depth, a resilient disk of a diameter to be sprung into said body and formed with marginal prongs extending into the seats formed in the walls of said body to retain the disk in a set position, a stem disposed axially in said body and slidably passing through said disk, a head for said stem, a spring about the stem engaging the disk and head to yieldably hold the head in sealing engagement with the internal seat of said body, the opening in said head through which said stem passes being tapered downwardly, a collar fitting loosely upon the stem above said disk and having a tapered lower portion resting in the tapered opening in the disk through which the stem passes, and an abutment pin passes transversely through the stem and projecting transversely therefrom above the collar and adapted to engage the collar to move the disk out of the body when the stem is drawn outwardly through the open lower end of the body.

In testimony whereof I affix my signature.

WILLIAM B. McBRIDE. [L. S.]